(12) United States Patent
Cutler (10) Patent No.: US 8,143,520 B2
(45) Date of Patent: Mar. 27, 2012

(54) UNIVERSAL WALL PLATE THERMOMETER

(76) Inventor: Paul Cutler, Charleston, SC (US)

( * ) Notice: Subject to any disclaimer, the term of this patent is extended or adjusted under 35 U.S.C. 154(b) by 461 days.

(21) Appl. No.: 12/460,600

(22) Filed: Jul. 22, 2009

(65) Prior Publication Data

US 2011/0017486 A1    Jan. 27, 2011

(51) Int. Cl.
    *H05K 5/03* (2006.01)
(52) U.S. Cl. ............. 174/66; 174/67; 220/241; 220/242
(58) Field of Classification Search .................... 174/66, 174/67, 17 CT, 53; 220/241, 242, 3.8; D8/350–353; D13/156, 177; 439/536
    See application file for complete search history.

(56) References Cited

U.S. PATENT DOCUMENTS

| | | | |
|---|---|---|---|
| 3,987,928 A * | 10/1976 | Mori ............................ | 220/241 |
| 4,745,243 A | 5/1988 | Wang | |
| 5,861,742 A | 1/1999 | Miller et al. | |
| 6,122,678 A | 9/2000 | Eckel et al. | |
| 6,207,899 B1 * | 3/2001 | Gillespie ........................ | 174/66 |
| 7,036,948 B1 | 5/2006 | Wyatt | |
| 7,067,737 B2 * | 6/2006 | Mallen ............................ | 174/66 |
| 7,071,414 B2 * | 7/2006 | Kim ................................ | 174/66 |
| 7,075,009 B1 * | 7/2006 | Rohmer ........................ | 174/66 |
| 7,102,081 B2 * | 9/2006 | Xu et al. ........................ | 174/66 |
| 7,273,983 B1 | 9/2007 | Rintz | |
| 7,728,226 B2 * | 6/2010 | Drane et al. .................... | 174/66 |
| 2002/0043978 A1 | 4/2002 | McDonald | |

* cited by examiner

Primary Examiner — Angel R Estrada
(74) Attorney, Agent, or Firm — P. Jeff Martin; The Law Firm of P. Jeffrey Martin, LLC (57) ABSTRACT

A light switch cover assembly easily mounted over existing wall type light switches. The cover assembly includes a mounting bracket having an opening provided therethrough which is shapely designed and sizably configured for snug attachment of a bracket plate therein. The bracket plate includes an opening to allow the protruding rocker portion of a light switch to pass therethrough. The bracket plate further includes a plurality of apertures defined therethrough for receipt of mounting screws. A face plate is adapted for removable attachment to the mounting bracket in a snap-fit manner. The face plate includes an opening shapely designed and sizably configured to snugly accommodate a rocker plate therein. The face plate further includes an oblong opening providing a thermometer support enclosure within which a thermometer is swivelably secured.

16 Claims, 6 Drawing Sheets

UNIVERSAL WALL PLATE THERMOMETER

RELATED APPLICATIONS

There are no previously filed, nor currently any co-pending applications, anywhere in the world.

BACKGROUND OF THE INVENTION

1. Field of the Invention

This application discloses and claims embodiments generally related to a light switch cover, and more particularly, to a light switch cover assembly with swivel thermometer, the assembly adapted for use with existing rocker or toggle light switches.

2. Description of the Related Art

The prior art teaches numerous light switch covers or plates for mounting over an existing wall switch. However, the prior art does not disclose a light switch cover assembly with swivel thermometer, the assembly adapted for use with existing wall switches.

Accordingly, a need has arisen for a combination universal wall plate thermometer. The development of the combination universal wall plate thermometer assembly fulfills this need.

A search of the prior art did not disclose any patents that read directly on the claims of the instant invention; however, the following references were considered related.

U.S. Pat. No. 7,273,983 B1, issued in the name of Rintz;
U.S. Patent Application no. 2002/0043978, published in the name of McDonald;
U.S. Pat. No. 7,036,948 B1, issued in the name of Wyatt;
U.S. Pat. No. 6,122,678, issued in the name of Eckel et al.;
U.S. Pat. No. 4,745,243, issued in the name of Wang; and
U.S. Pat. No. 5,861,742, issued in the name of Miller et al.

Consequently, a need has been felt for a universal light switch cover assembly having a swiveling thermometer. This application presents claims and embodiments that fulfill a need or needs not yet satisfied by the products, inventions and methods previously or presently available. In particular, the claims and embodiments disclosed herein describe a light switch cover assembly for use with rocker or decora, and toggle type light switches, the light switch cover assembly providing unanticipated and nonobvious combination of features distinguished from the products, inventions and methods preexisting in the art. The applicant is unaware of any product, method, disclosure or reference that discloses the features of the claims and embodiments disclosed herein.

SUMMARY OF THE INVENTION

Therefore, it is an object of the present invention to provide a light switch cover assembly adapted for use with rocker or decora, and toggle type light switches.

It is another object of the present invention to provide a mounting bracket having a panel protruding integrally from the upper surface of the body thereof so as to form a gasket support well.

It is another object of the present invention to provide a gasket which is snugly received within a gasket support well of the mounting bracket.

It is another object of the present invention to provide a bracket plate adapted for removable attachment to the mounting bracket.

It is another object of the present invention to provide a face plate adapted for removable attachment to the mounting bracket.

It is another object of the present invention to provide a rocker plate adapted for removable attachment to the face plate.

It is another object of the present invention to provide a face plate which includes a thermometer support enclosure within which a thermometer is swivelably secured.

It is still another object of the present invention to provide a thermometer having a Fahrenheit scale provided on one side thereof, and a Celsius scale C provided on an opposing side thereof.

It is yet another object of the present invention to provide each side of the thermometer with a colored zone within which a user is directed to set or maintain heat and air conditioning temperatures to facilitate optimum energy and monetary conservation.

In accordance with one embodiment of the present invention, a light switch cover assembly is disclosed. The cover assembly is easily mounted over existing wall type light switches. The cover assembly comprises a mounting bracket having a panel protruding integrally from the upper surface of the body thereof so as to form a gasket support well. The mounting bracket includes an opening provided through the panel and the body thereof which is shapely designed and sizably configured for snugly receiving a bracket plate therein.

The bracket plate is adapted for removable attachment to the mounting bracket. The bracket plate includes an opening to allow the protruding switch portion of a rocker switch or a toggle switch to pass therethrough. The bracket plate further includes a plurality of apertures defined therethrough for receipt of mounting screws.

A gasket is provided, wherein gasket includes a longitudinally oriented panel protruding integrally from the upper surface thereof, the panel is snugly received within the gasket support well of the mounting bracket. An opening is provided through the panel of gasket to allow the protruding switch portion of the rocker switch or toggle switch to pass therethrough. The gasket further includes a plurality of apertures defined through the panel thereof for receipt of mounting screws.

A face plate is provided, wherein the face plate is adapted for removable attachment to the mounting bracket in a snap-fit manner. The face plate includes an opening shapely designed and sizably configured to snugly accommodate a rocker plate therein. The upper surface of the face plate may be provided with ornamentation or indicia in the form of a company or corporate name, logo, wording, picture, photograph, or any other decorative, informational, promotional or advertisement indicia.

The face plate further includes an oblong opening providing a thermometer support enclosure within which a thermometer is swivelably secured.

The rocker plate is adapted for removable attachment to the face plate. The rocker plate includes an opening defined through the rocker plate panel and the body thereof to allow the protruding switch portion of the rocker switch or the toggle switch to pass therethrough.

The thermometer has a Fahrenheit scale provided on one side thereof, and a Celsius scale C provided on an opposing side thereof. Each side of the thermometer is provided with a colored zone, i.e., green zone, within which a user is directed to set or maintain heat and air conditioning temperatures to facilitate optimum energy and monetary conservation.

The use of the present invention allows rocker or decora, and toggle type light switches to be quickly, easily, and efficiently mounted with a light switch cover assembly that visually provides a consumer with an optimum temperature range within which to set or maintain heat and air conditioning temperatures to facilitate optimum energy and monetary conservation.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

Detailed Description of the Figures

With reference to FIGS. 1-4, a light switch cover assembly 10 is disclosed, according to one embodiment of the present invention. The light switch cover assembly 10, hereinafter cover assembly 10, comprises a mounting bracket 20 which includes a body 22 having an upper surface 23 and a lower surface 24, an upper edge 25, a lower edge 25a, a first side edge 25b, and a second side edge 25c. Mounting bracket 20 can be constructed of a rigid plastic, rigid plastic polymer, thermoplastic, castable plastic or plastic capable of injection molding, blow molding, extrusion, and the like. A longitudinally oriented panel 26 protrudes integrally from the upper surface 23 of body 22 forming a gasket support well 32 in the lower surface 24 of body 22, the panel 26 includes a curved upper edge member 29, a bottom edge member 29a, a left vertical edge member 27 and a right vertical edge member 28.

Figure 1:
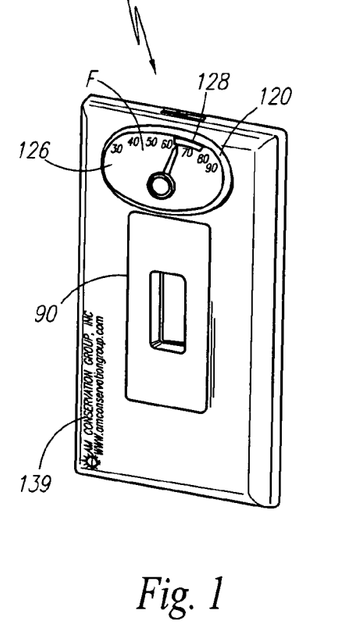
FIG. 1 is a perspective view of a light switch cover assembly, according to the preferred embodiment of the present invention.
Figure 1A:
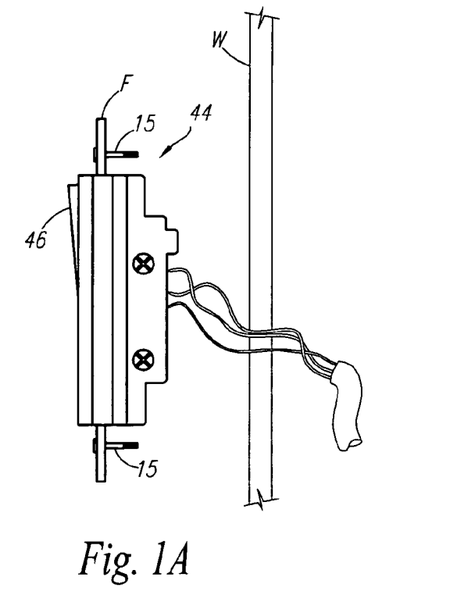
FIG. 1A is a side elevational view of a rocker or decora switch.
Figure 1B:
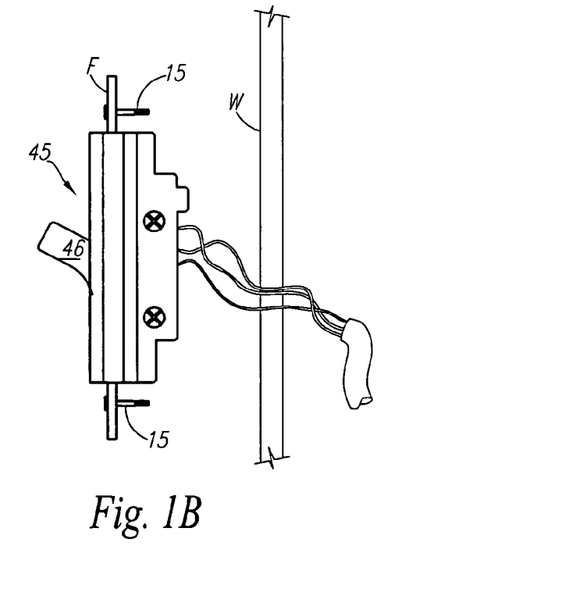
FIG. 1B is a side elevational view of a toggle switch.

An opening 30 is provided through panel 26 and body 22 of mounting bracket 20, the opening 30 is shapely designed and sizably configured for snugly receiving a bracket plate 70 therein. The rocker or decora switch 44 is illustrated in FIG. 1A, shown adjacent a wall W behind which switch 44 is intended to be embedded. The toggle switch 45 is illustrated in FIG. 1B, shown adjacent a wall W behind which switch 45 is intended to be embedded.

Figure 2:
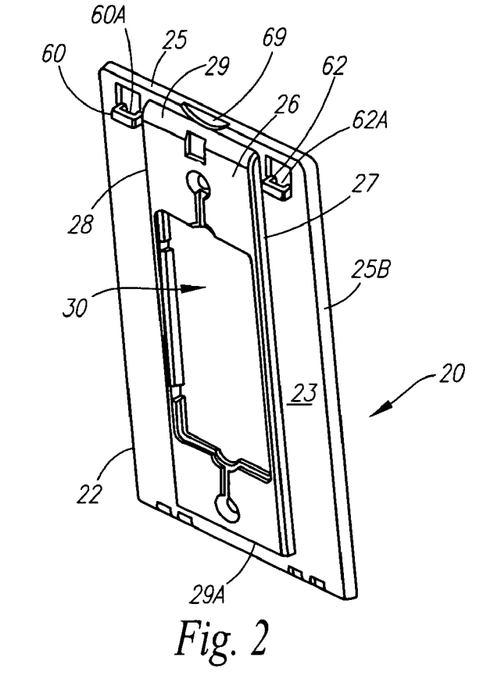
FIG. 2 is a front perspective view of the mounting bracket, according to the preferred embodiment of the present invention.
Figure 3:
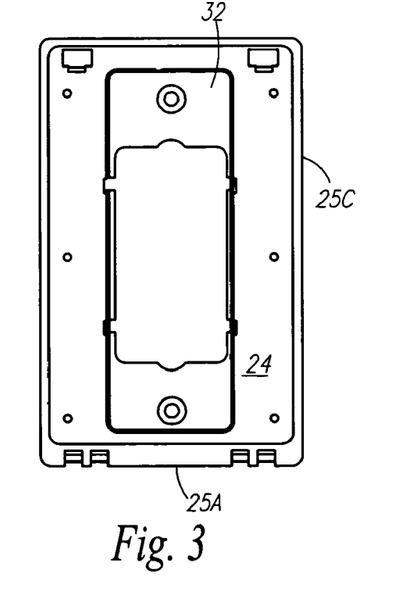
FIG. 3 is a bottom plan view of the mounting bracket of FIG. 2.
Figure 4:
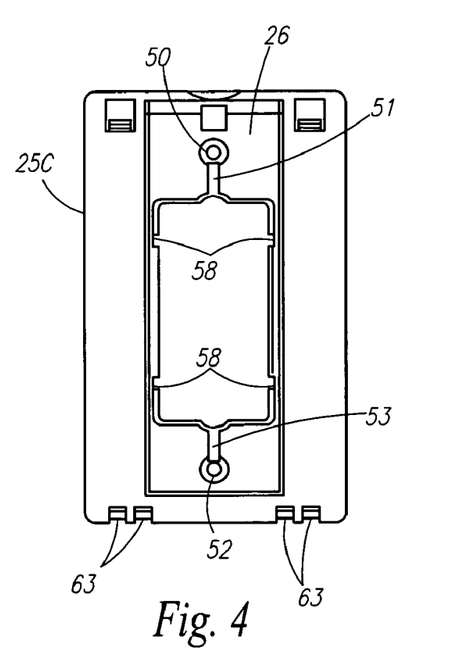
FIG. 4 is a top plan view of the mounting bracket of FIG. 2.

The mounting bracket 20 includes a first head receiving aperture 50 and a second head receiving aperture 52. The first head receiving aperture 50 is defined through panel 26 and body 22 of mounting bracket 20, above the opening 30 thereof, and the second head receiving aperture 52 is defined through panel 26 and body 22 of mounting bracket 20, below the opening thereof. A first shallow channel 51 extends downward from the first head receiving aperture 50 through panel 26 and into opening 30. A second shallow channel 53 extends upward from the second head receiving aperture 52 through panel 26 and into opening 30.

The mounting bracket 20 further includes a first tab 60 protruding outwardly from the upper surface 23 of body 22 below the upper edge 25 thereof and adjacent the right vertical edge member 28 of panel 26, and a second tab 62 protruding outwardly from the upper surface 23 of body 22 below the upper edge 25 thereof and adjacent the left vertical edge member 27 of panel 26. The first tab 60 includes a flange receiving recess 60a, and the second tab 62 includes a flange receiving recess 62a.

A plurality of bosses 63 are provided along the lower edge 25a of the body 22 of mounting bracket 20 for mating with an equal number of respective flexible clips 156 associated with a face plate 130 (to be described later in greater detail). Preferably, four bosses 63 are provided.

A plurality of female receiving recesses 58 are provided along an inner sidewall of panel 26 for receipt of respective tab members 74 associated with a bracket plate 70 (to be described later in greater detail). Preferably, four recesses 58 and tab members 74 are provided.

A concave recess 69 is defined centrally along the upper edge 25 of the body 22 of mounting bracket 20 to facilitate disassembly of the light switch cover assembly 10.

Figure 5:
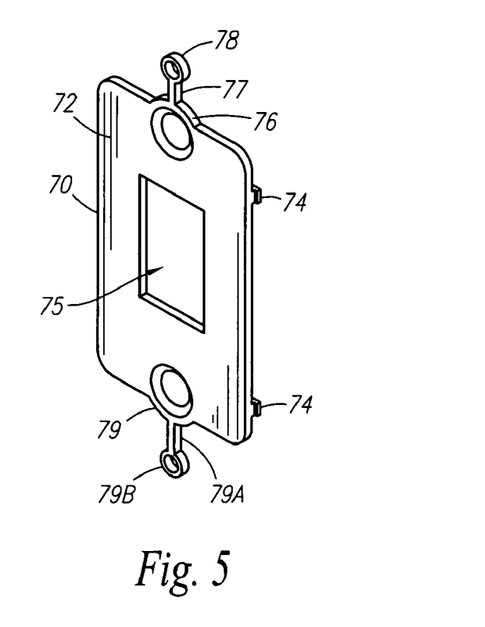
FIG. 5 is a front perspective view of the bracket plate, according to the preferred embodiment of the present invention.
Figure 6:
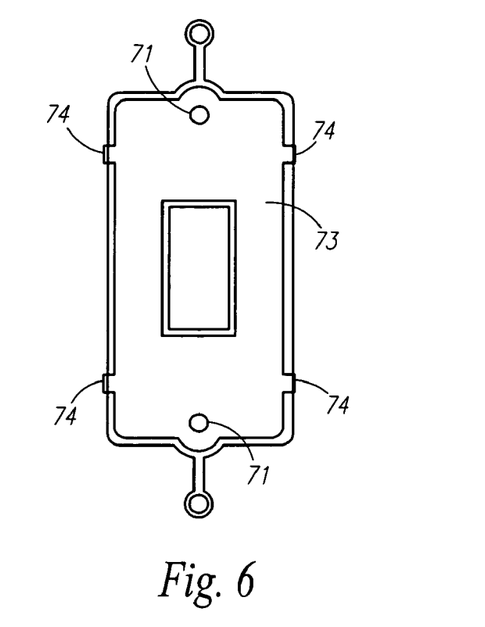
FIG. 6 is a bottom plan view of the bracket plate of FIG. 5.
Figure 7:
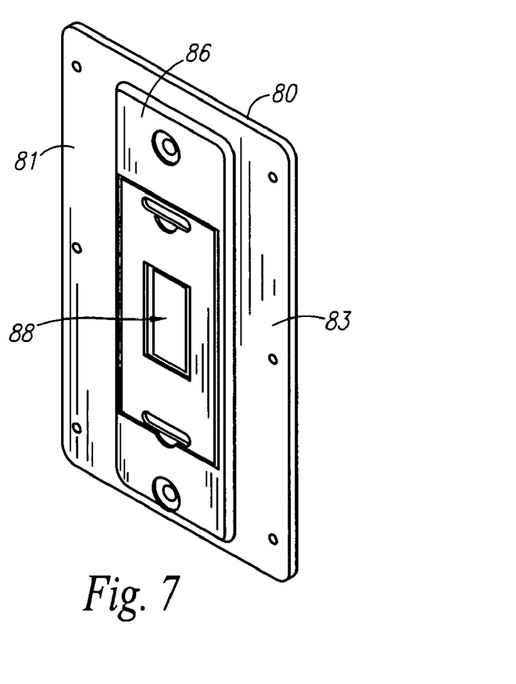
FIG. 7 is a front perspective view of the gasket, according to the preferred embodiment of the present invention.
Figure 8:
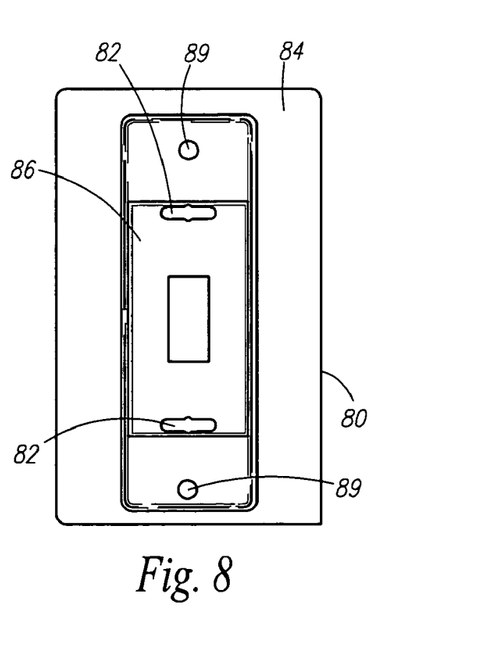
FIG. 8 is a bottom plan view of the gasket of FIG. 7.
Figure 15:
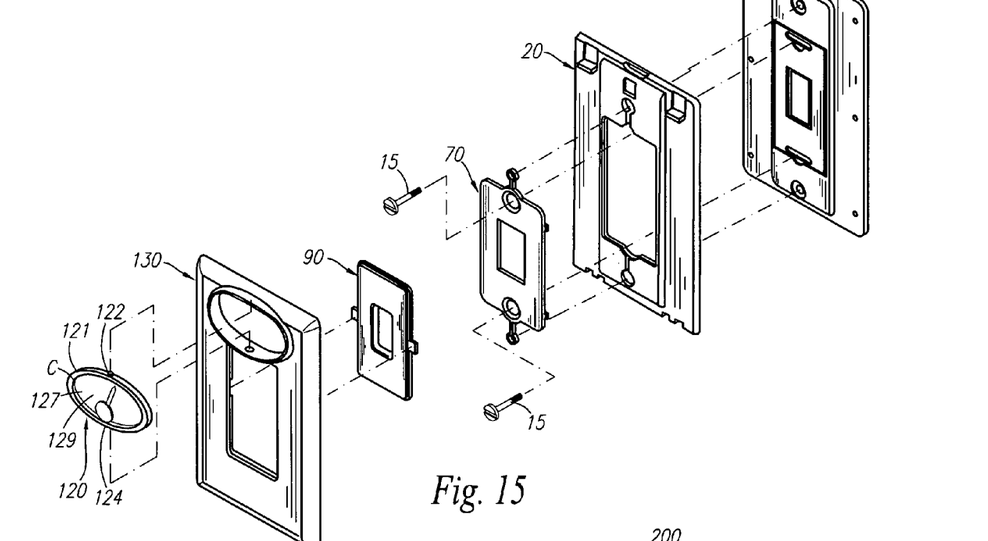
FIG. 15 is an exploded perspective view of one embodiment for the light switch cover assembly in accordance with the present invention.

Referring now to FIGS. 5-6, and 15, the bracket plate 70 comprises a generally rectangular configuration having an upper surface 72 and a lower surface 73, the bracket plate 70 includes an opening 75 to allow the protruding switch portion 46 of the rocker switch 44 or toggle switch 45 to pass therethrough. Bracket plate 70 can be constructed of a rigid plastic, rigid plastic polymer, thermoplastic, castable plastic or plastic capable of injection molding, blow molding, extrusion, and the like.

Bracket plate 70 further comprises a plurality of tab members 74 extending integrally from the lower surface 73, spatially about a perimeter of the bracket plate 70 for mating respectively with the female receiving recesses 58 of the panel 26 of the mounting bracket 20.

The bracket plate 70 includes an upper edge from which an upper convex curvature 76 integrally extends upward intermediate therefrom. A linearly elongated first neck 77 integrally extends upward from the upper convex curvature 76 terminating into a bulbous head 78. Bracket plate 70 includes a lower edge from which a lower convex curvature 79 integrally extends intermediate downward therefrom. A linearly elongated second neck 79a integrally extends downward from the lower convex curvature 79 terminating into a bulbous head 79b. The first neck 77 and head 78 are frictionally received and held in a snap-fit manner within the first shallow channel 51 and first head receiving aperture 50, respectively, of bracket 20, and the second neck 79a and head 79b are frictionally received and held in a snap-fit manner within the second shallow channel 53 and second head receiving aperture 52, respectively, of bracket 20, thereby removably attaching bracket plate 70 to bracket 20.

Bracket plate 70 is further provided with a plurality of apertures 71 defined therethrough for receipt of mounting screws 15. Preferably, two apertures 71 are provided, wherein the apertures 71 are provided above and below opening 75.

Referring now more specifically to FIGS. 3, 7-8, and 15, the gasket 80 comprises a body 81 having an upper surface 83 and a lower surface 84. Gasket 80 can be constructed of a rigid plastic, rigid plastic polymer, thermoplastic, castable plastic or plastic capable of injection molding, blow molding, extrusion, and the like. A longitudinally oriented panel 86 protrudes integrally from the upper surface 83 of body 81, the panel 86 is snugly received within the gasket support well 32 of the body 22 of the mounting bracket 20. An opening 88 is provided through panel 86 and body 81 of gasket 80 to allow the protruding switch portion 46 of the rocker switch 44 or toggle switch 45 to pass therethrough. The gasket 80 is further provided with a plurality of apertures 82 defined through the panel 86 thereof for receipt of mounting screws 15. Preferably, two apertures 82 are provided, wherein the apertures 82 are provided above and below opening 88. Gasket may include a plurality of holes 89 defined through the panel 86 thereof, the holes 89 being provided above respective apertures 82.

Referring now more particularly to FIGS. 2, 4, 9-10, and 15, a rocker plate 90 is disclosed. The rocker plate 90 comprises a body 91 having an upper surface 92 and a lower surface 93, an upper edge 94, a lower edge 95, a first side edge 96, and a second side edge 97. Rocker plate 90 can be constructed of a rigid plastic, rigid plastic polymer, thermoplastic, castable plastic or plastic capable of injection molding, blow molding, extrusion, and the like. A rocker plate panel 100 is molded integral to or mounted to the upper surface 92 of body 91 of rocker plate 90. The rocker plate panel 100 has a surface area measuring less than a surface area defining the body 91 of the rocker plate 90. An opening 102 is provided through rocker plate panel 100 and body 91 of rocker plate 90 to allow the protruding switch portion 46 of the rocker switch 44 or toggle switch 45 to pass therethrough.

Figure 9:
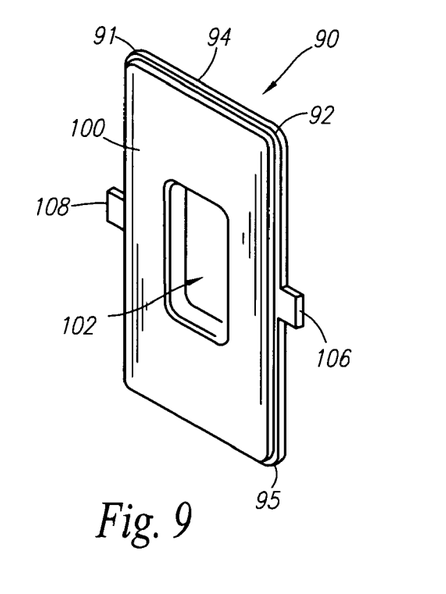
FIG. 9 is a front perspective view of the rocker plate; according to the preferred embodiment of the present invention.
Figure 10:
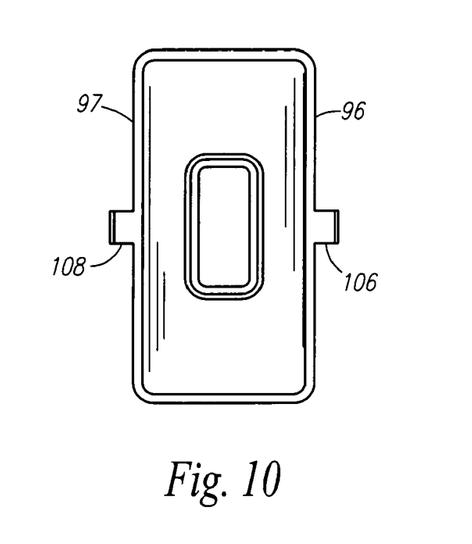
FIG. 10 is a top plan view of the rocker plate of FIG. 9.
Figure 11:
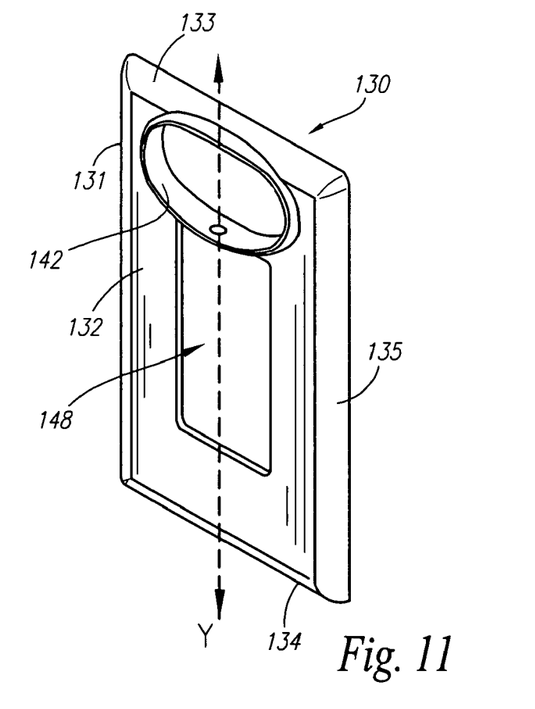
FIG. 11 is a front perspective view of the face plate, according to the preferred embodiment of the present invention.

The rocker plate 90 further comprises a first planar post 106 and a second planar post 108 for frictionally engaging a first post receiving cavity 52 and a second post receiving cavity 56, respectively, of a face plate 130 (to be described later in greater detail), thereby removably attaching rocker plate 90 to the face plate 130 in a snap-fit fashion. The first planar post 106 integrally extends outward from the first side edge 96 of body 91, the second planar post 108 integrally extends outward from the second side edge 97 of body 91. When removably attaching the rocker plate 90 to the face plate 130, the rocker plate panel 100 is positioned apositional to a lower surface 132a of face plate 130, and a periphery of the body 91 of rocker plate 90 is engaged against a perimetrical recess 138a formed in the lower surface 132a of face plate 130.

Once the mounting bracket 20, bracket plate 70, gasket 80, rocker plate 90, and face plate 130 are assembled, the apertures 71 of bracket plate 70 align with apertures 82 of gasket 80, and the apertures 71 and 82 of both bracket plate 70 and gasket 80, respectively, are aligned with corresponding screw passageways (not shown) associated with a rocker switch 44 or toggle switch 45 flange F. Mounting screws 15 are then inserted in their respective apertures 71 bracket plate 70, in their respective apertures 82 of gasket 80, and in corresponding screw passageways (not shown) associated with the rocker switch 44 or toggle switch 45 flange F, thereby mounting mounting bracket 20 and its associated attached elements over an existing rocker switch 44 or toggle switch 45.

Referring now to FIGS. 1, and 11-15, a face plate 130 or cover is disclosed, wherein face plate 130 comprises a plate body 131 having an upper surface 132 opposing a lower surface 132a, an upper sidewall 133, a lower sidewall 134, a left sidewall 135, a right sidewall 136, and an open rear 137 providing open access to a compartmentalized interior 138. Face plate 130 can be constructed of a rigid plastic, rigid plastic polymer, thermoplastic, castable plastic or plastic capable of injection molding, blow molding, extrusion, and the like. Face plate 130 has an opening 148 shapely designed and sizably configured to snugly accommodate the rocker plate 90 therein.

Figure 13:
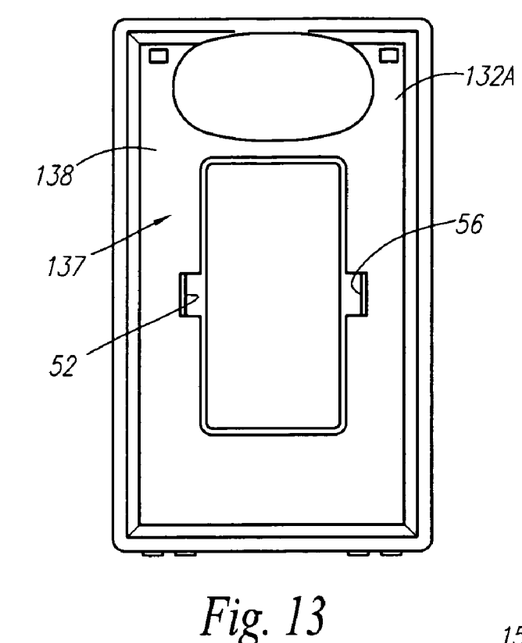
FIG. 13 is a bottom plan view of the face plate of FIG. 11.

The lower surface 132a has a first post receiving cavity 52 and a second post receiving cavity 56 for receiving the first planar post 106 and the second planar post 108, respectively, of rocker plate 90 in a snap-fit manner, thereby removably attaching rocker plate 90 to the face plate 130.

Figure 14:
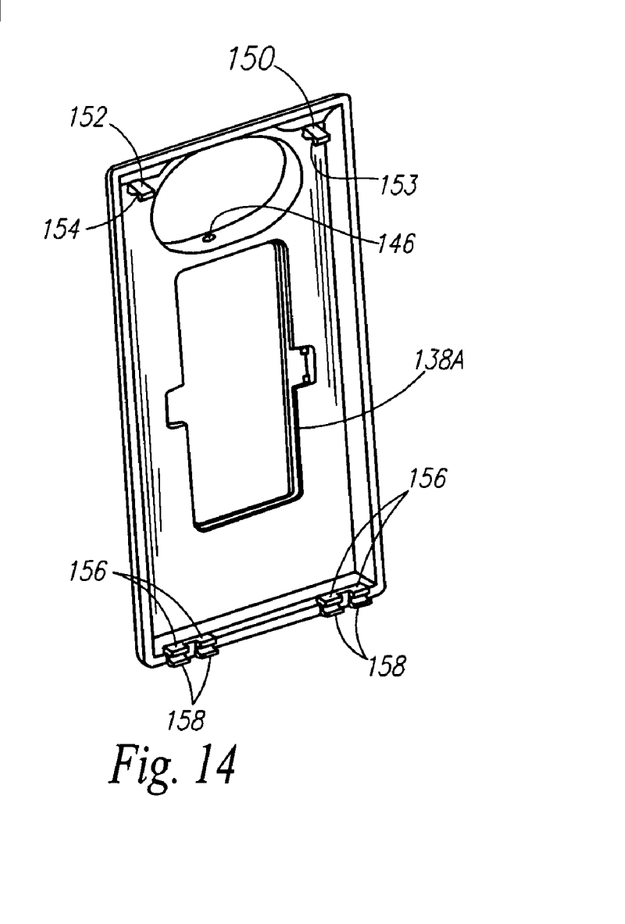
FIG. 14 is a rear perspective view of the face plate of FIG. 11.

The face plate 130 includes a pair of flexible tongues 150, 152 extending outwardly from the lower surface 132a of plate body 131, below the upper sidewall 133 thereof. The flexible tongues 150, 152 each include a downwardly depending flange 153, 154 respectively, for frictional connective engagement with the flange receiving recess 60a of first tab 60 and the flange receiving recess 62a of second tab 62, respectively, thereby removably attaching face plate 130 to mounting bracket 20. A plurality of flexible clips 156 are provided along the lower sidewall 134 of the plate body 131 of face plate 130 for mating with an equal number of bosses 63 associated with the mounting bracket 20. The flexible clips 156 each include a constricted cavity 158 within which a respective boss 63 is frictionally received and held therein, thereby assisting in the removable attachment of face plate 130 to mounting bracket 20.

The face plate 130 further comprises an oblong opening 140 defined therethrough along an upper portion thereof, and between the flexible tongues 150, 152. A perimeter of the oblong opening 140 extends forward integrally from the upper surface 132 of face plate 130 so as to provide a thermometer support enclosure 142 within which a thermometer 120 (to be described later in greater detail) may swivel. The thermometer support enclosure 142 includes an upper pin slot 144 and an opposing lower pin slot 146 for receipt of respective pins 122, 124 associated with the thermometer 120. The upper pin slot 144 is defined perpendicularly through an upper, inner surface of thermometer support enclosure 142, and lower pin slot 146 is defined perpendicularly through a lower, inner surface of thermometer support enclosure 142. The upper pin slot 144 is linearly aligned with lower pin slot 146, as referenced by vertical axis Y.

Referring now more specifically to FIGS. 1, 11, 12, and 15, the thermometer 120 comprises a housing 121, preferably transparent, having an oblong shape and is suitably sized to be snugly received within thermometer support enclosure 142. The housing 121 includes a top pin 122 extending upward centrally from an upper surface thereof, and a bottom pin 124 extending downward centrally from a lower surface thereof. The housing 121 is removably coupled to the thermometer support enclosure 142, and thus the face plate 130, and is further allowed to swivel about vertical axis Y, by inserting the top pin 122 into the upper pin slot 144 and inserting the bottom pin 124 into the lower pin slot 146.

Figure 12:
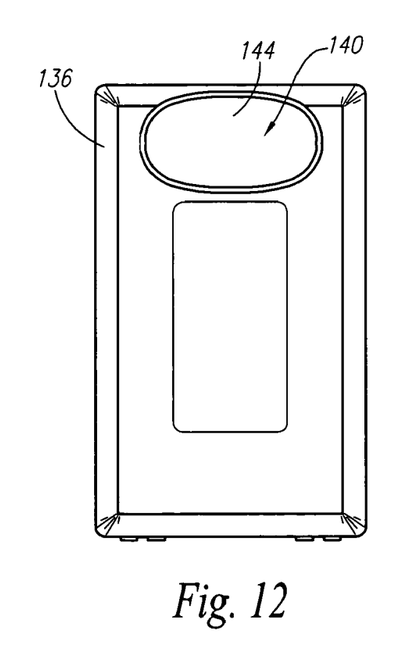
FIG. 12 is a top plan view of the face plate of FIG. 11.

The thermometer 120 further comprises a Fahrenheit scale F provided on one side thereof, and a Celsius scale C provided on an opposing side thereof. More specifically, the housing 121 includes a Fahrenheit scale F disposed on a dial 126 contained inside housing 121 and is visible from one side thereof, and a Celsius scale C disposed on a dial 127 contained inside housing 121 and visible on an opposing side thereof. Each of the dials 126, 127 of the scales F, C, respectively, are provided with a colored zone 128 within which a user is directed to set or maintain heat and air conditioning temperatures to facilitate optimum energy and monetary conservation. The colored zone 128 may be provided in any number of colors including but not limited to blue, orange, red, purple, beige, brown, yellow, and pink, however, the colored zone 128 is preferably green in color.

It is envisioned that dials 126 and 127 may include an illuminatable coating 129 to assist user in detecting the thermometer 120 in a dark or dimly lit room.

The upper surface 132 of the face plate 130 may be provided with ornamentation or indicia 139 in the form of a company or corporate name, logo, wording, picture, photograph, or any other decorative, informational, promotional or advertisement indicia. In addition, the light switch cover assembly 10, and particularly the face plate 130, are designed and configured to conceal mounting screws 15, thereby providing a greater, clean surface area upon which indicia 139 may be disposed.

To assemble the light switch cover assembly 10, the first neck 77 and head 78 of bracket plate 70 are fastened to the first shallow channel 51 and first head receiving aperture 50, respectively, of mounting bracket 20 in a snap-fit manner, and the second neck 79a and head 79b of bracket plate 70 are fastened to the second shallow channel 53 and second head receiving aperture 52, respectively, of mounting bracket 20 in a snap-fit manner, thereby removably attaching bracket plate 70 to mounting bracket 20. The longitudinally oriented panel 86 of gasket 80 is snugly received within the gasket support well 32 of the body 22 of the mounting bracket 20, with the apertures 71 of bracket plate 70 in linear alignment with respective apertures 82 of gasket 80. Mounting screws 15 are each inserted in their respective apertures 71 of bracket plate 70, in their respective apertures 82 of gasket 80, and in corresponding screw passageways (not shown) associated with a rocker switch 44 or toggle switch 45 flange F, thereby mounting the mounting bracket 20 and associated attached elements over an existing rocker switch 44 or toggle switch 45. The top pin 122 of thermometer 120 is inserted into the upper pin slot 144 of thermometer support enclosure 142, and the bottom pin 124 of thermometer 120 is inserted into the lower pin slot 146 of thermometer support enclosure 142, thereby removably coupling thermometer 120 to face plate 130, and further allowing thermometer 120 to swivel about vertical axis Y. The first planar post 106 and the second planar post 108 of rocker plate 90 are fastened to the first post receiving cavity 52 and the second post receiving cavity 56, respectively, of face plate 130 in a snap-fit manner, thereby removably attaching rocker plate 90 to the face plate 130. Downwardly depending flanges 153, 154 of flexible tongues 150, 152, respectively, of face plate 130 are aligned with and frictionally engage the flange receiving recess 60a of first tab 60 and the flange receiving recess 62a of second tab 62, respectively, of mounting bracket 20. The plurality of flexible clips 156 of face plate 130 are aligned with and frictionally engage an equal number of bosses 63 associated with the mounting bracket 20, thereby removably attaching face plate 130 to mounting bracket 20.

Figure 16:
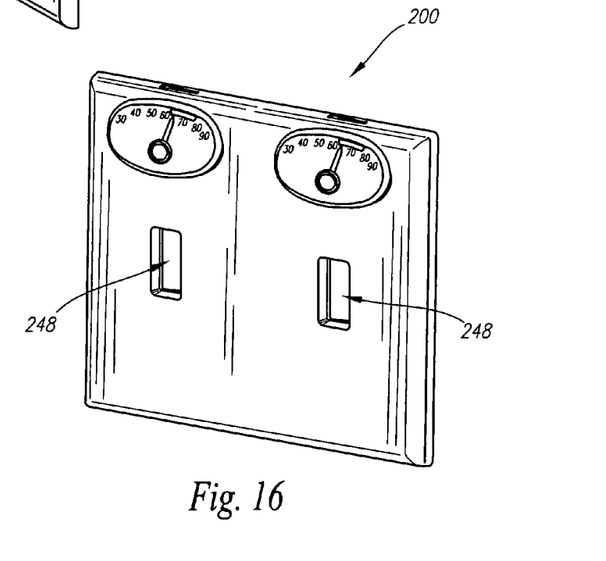
FIG. 16 is a perspective view of a light switch cover assembly, according to an alternate embodiment of the present invention.

The teachings of the first embodiment of the present invention can also be utilized when more than one switch portion 46 of a rocker switch 44 or toggle switch 45 is provided. As illustrated in FIG. 16, an alternate embodiment light switch cover assembly 200 is disclosed incorporating a face plate 330 having multiple openings 248 for receiving multiple protruding switch portions 46 of a rocker switch 44 or toggle switch 45. Face plate 330 is structured and constructed similar to face plate 130 except being wider in width in order to accommodate all of the switch portions 46 provided and being adapted with at least two mounting plates, at least two bracket plates, at least two rocker plates, and at least two gaskets for receiving multiple protruding switch portions 46 of a rocker switch 44 or toggle switch 45. The at least two mounting plates, at least two bracket plates, at least two rocker plates, and at least two gaskets are constructed substantially similar to their respective counterparts or counter-elements of the preferred embodiment.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A light switch cover assembly, the cover assembly comprising:
   a mounting bracket, the mounting bracket comprising an opening defined therethrough, the mounting bracket includes a gasket support well;
   a face plate, the face plate is removably attached to the mounting bracket in a snap-fit manner, wherein the face plate includes an oblong opening providing a thermometer support enclosure;
   a thermometer, the thermometer is swivelably secured inside the thermometer support enclosure;
   a bracket plate, the bracket plate comprises an opening to allow a protruding switch portion of a rocker switch or a toggle switch to pass therethrough, the bracket plate is removably attached to the mounting bracket, and wherein the bracket plate includes a plurality of apertures defined therethrough for receipt of mounting screws;
   a rocker plate, the rocker plate is removably attached to the face plate; and
   a gasket, the gasket comprises a longitudinally oriented panel, the panel is snugly received within the gasket support well of the mounting bracket, the panel has an opening to allow the protruding switch portion of the rocker switch or the toggle switch to pass therethrough, and wherein the gasket includes a plurality of apertures defined through the panel for receipt of a mounting screws, the apertures of the gasket align with the apertures of the bracket plate.

2. The light switch cover assembly of claim 1, wherein the mounting bracket further comprises a body having an upper surface and a lower surface, an upper edge, a lower edge, a first side edge, and a second side edge, the mounting bracket includes a panel protruding integrally from the upper surface of the body of the mounting bracket forming the gasket support well in the lower surface of the body thereof, the panel of the mounting bracket includes a curved upper edge member, a bottom edge member, a left vertical edge member and a right vertical edge member, the panel of the mounting bracket includes an opening provided therethrough and through the body of the mounting bracket, wherein the opening through the panel and the body of the mounting bracket is shapely designed and sizably configured for snugly receiving the bracket plate therein.

3. The light switch cover assembly of claim 2, wherein the mounting bracket further comprises:
   a first head receiving aperture and a second head receiving aperture, the first head receiving aperture is defined through the panel and the body of the mounting bracket, above the opening thereof, the second head receiving aperture is defined through the panel and the body of the mounting bracket, below the opening thereof;
   a first shallow channel, the first shallow channel extends downward from the first head receiving aperture through the panel and into the opening;
   a second shallow channel, the second shallow channel extends upward from the second head receiving aperture through the panel and into the opening;
   a first tab protruding outwardly from the upper surface of the body below the upper edge thereof and adjacent the right vertical edge member of the panel;
   a second tab protruding outwardly from the upper surface of the body below the upper edge thereof and adjacent the left vertical edge member of the panel;
   a plurality of bosses provided along the lower edge of the body of mounting bracket;
   a plurality of female receiving recesses provided along an inner sidewall of the panel of the mounting bracket; and
   a concave recess defined centrally along the upper edge of the body of the mounting bracket to facilitate disassembly of the light switch cover assembly.

4. The light switch cover assembly of claim 1, wherein the bracket plate further comprises:
   a generally rectangular configuration having an upper surface and a lower surface;
   a plurality of tab members extending integrally from the lower surface thereof for mating respectively with the female receiving recesses of the panel of the mounting bracket;
   an upper edge from which an upper convex curvature integrally extends upward intermediate therefrom;
   a linearly elongated first neck integrally extends upward from the upper convex curvature terminating into a first bulbous head;
   a lower edge from which a lower convex curvature integrally extends intermediate downward therefrom; and
   a linearly elongated second neck integrally extends downward from the lower convex curvature terminating into a second bulbous head, wherein the first neck and the first head are frictionally received and held in a snap-fit manner within the first shallow channel and the first head receiving aperture, respectively, of the mounting bracket, and the second neck and the second head are frictionally received and held in a snap-fit manner within the second shallow channel and the second head receiving aperture, respectively, of the mounting bracket, thereby removably attaching the bracket plate to the mounting bracket, and wherein the plurality of apertures of the bracket plate are provided above and below the opening thereof.

5. The light switch cover assembly of claim 1, wherein the gasket further comprises a body having an upper surface and a lower surface, the upper surface from which the panel of the gasket protrudes integrally.

6. The light switch cover assembly of claim 1, wherein the rocker plate further comprises:
   a body having an upper surface and a lower surface, an upper edge, a lower edge, a first side edge, and a second side edge;
   a rocker plate panel molded integral to or mounted to the upper surface of the body of the rocker plate, the rocker plate panel has a surface area measuring less than a surface area defining the body of the rocker plate;
   an opening provided through the rocker plate panel and the body of the rocker plate to allow the protruding switch portion of the rocker switch or the toggle switch to pass therethrough;
   a first planar post, the first planar post integrally extends outward from the first side edge of the body of the rocker plate; and
   a second planar post, the second planar post integrally extends outward from the second side edge of the body of the rocker plate.

7. The light switch cover assembly of claim 1, wherein the face plate further comprises:
   an opening shapely designed and sizably configured to snugly accommodate the rocker plate therein;

a plate body having an upper surface opposing a lower surface, an upper sidewall, a lower sidewall, a left sidewall, a right sidewall, and an open rear providing open access to a compartmentalized interior, the lower surface of the plate body of face plate has a first post receiving cavity and a second post receiving cavity for receiving the first planar post and the second planar post, respectively, of the rocker plate in a snap-fit manner, thereby removably attaching the rocker plate to the face plate, the lower surface of the plate body includes a perimetrical recess formed therein against which a periphery of the body of the rocker plate is engaged;

a pair of flexible tongues extending outwardly from the lower surface of the plate body, below the upper sidewall thereof, the flexible tongues each include a downwardly depending flange for frictional connective engagement with the flange receiving recess of the first tab of the mounting bracket and the flange receiving recess of the second tab of the mounting bracket, respectively, thereby removably attaching the face plate to the mounting bracket; and a plurality of flexible clips provided along the lower sidewall of the plate body of the face plate for mating with an equal number of the bosses of the mounting bracket, the flexible clips each include a constricted cavity within which a respective boss is frictionally received and held therein, thereby assisting in the removable attachment of the face plate to the mounting bracket.

8. The light switch cover assembly of claim 1, wherein the oblong opening of the face plate is defined therethrough along an upper portion thereof, between the flexible tongues, the oblong opening has a perimeter which extends forward integrally from the upper surface of the face plate so as to provide the thermometer support enclosure within which the thermometer may swivel, the thermometer support enclosure includes an upper pin slot and an opposing lower pin slot, the upper pin slot is defined perpendicularly through an upper, inner surface of the thermometer support enclosure, and the lower pin slot is defined perpendicularly through a lower, inner surface of the thermometer support enclosure, the upper pin slot is linearly aligned with the lower pin slot.

9. The light switch cover assembly of claim 8, wherein the thermometer comprises a housing having an oblong shape and is suitably sized to be snugly received within the thermometer support enclosure, the housing includes a top pin extending upward centrally from an upper surface thereof, and a bottom pin extending downward centrally from a lower surface thereof, the top pin is inserted into the upper pin slot of thermometer support enclosure, and the bottom pin is inserted into the lower pin slot of thermometer support enclosure, thereby swivelably coupling the housing to the thermometer support enclosure and thus the face plate.

10. The light switch cover assembly of claim 9, wherein the thermometer further comprises a Fahrenheit scale provided on one side thereof, and a Celsius scale provided on an opposing side thereof.

11. The light switch cover assembly of claim 10, wherein the Fahrenheit scale is disposed on a first dial contained inside the housing and is visible from one side thereof, the Celsius scale is disposed on a second dial contained inside the housing and is visible on an opposing side thereof.

12. The light switch cover assembly of claim 11, wherein the first dial and the second dial are each provided with a colored zone within which a user is directed to set or maintain heat and air conditioning temperatures to facilitate optimum energy and monetary conservation.

13. The light switch cover assembly of claim 12, wherein the colored zone is green in color.

14. The light switch cover assembly of claim 12, wherein the first dial and the second dial each include an illuminatable coating to assist user in detecting the thermometer in a dark or dimly lit room.

15. The light switch cover assembly of claim 9, wherein the housing of the thermometer is transparent.

16. The light switch cover assembly of claim 7, wherein the upper surface of the plate body of the face plate is provided with ornamentation or indicia.

* * * * *